United States Patent Office 2,809,094
Patented Oct. 8, 1957

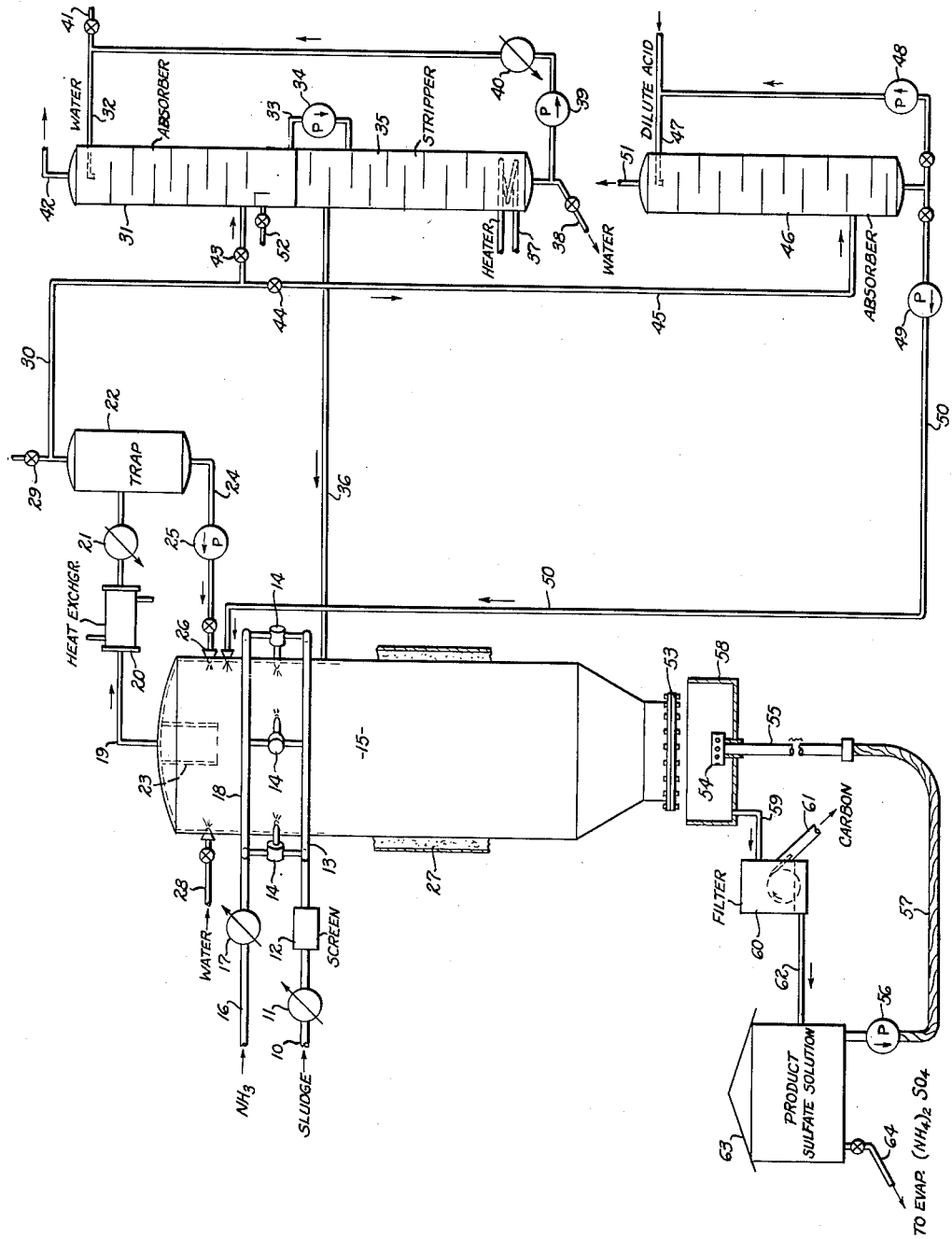

2,809,094

PRODUCTION OF AMMONIUM SULFATE AND CARBON FROM SULPHURIC ACID SLUDGES

Ulric B. Bray, Pasadena, and Vanderveer Voorhees, Los Altos, Calif.

Application November 30, 1953, Serial No. 395,042

9 Claims. (Cl. 23—119)

This invention relates to the production of ammonium sulfate from sludges and more particularly from sulfuric acid sludges produced as a by-product in the petroleum, coal and shale distillation industries. The invention further relates to a method of disposing of waste sulfuric acid sludges by conversion to valuable ammonium sulfate suitable as a fertilizer or for other purposes to which ammonium sulfate is ordinarily applied.

Still more particularly, the invention relates to a method of disposing of acid sludges and producing ammonium sulfate simultaneously, rapidly and efficiently without pollution of the atmosphere or ground water. The invention also relates to a method of making valuable adsorbent carbon from sulfuric acid sludges.

The invention is illustrated by a drawing which shows diagrammatically an apparatus for carrying out the process.

It has heretofore been the practice in refining lubricating oils, fuel oils and other petroleum products, to contact the oil with strong sulfuric acid, the process being called "acid-treating." Acid, having a concentration of 93% to 98%, is frequently employed for this purpose. In the manufacture of white oils, such as medicinal oils, it is necessary to use fuming sulfuric acids and a large portion of the oil is converted to sludge, e. g., up to 50% of its volume. Customarily, from about one-half to five pounds of acid per gallon of oil is employed, depending on the extent of refinement of the oil which is required.

In the manufacture of sulfonic acids and more particularly in the preparation of the preferentially oil soluble sulfonic acids, aromatic oils are treated with fuming acid to effect sulfonation of the oil, the temperature usually being held below about 125 to 140° F. to avoid decomposition of the desired sulfonic acids held in solution in the oil. For this purpose, lubricating fractions having a viscosity of about 100 to 500 sec. Saybolt at 100° F. from selected aromatic type oils are preferred. We can also sulfonate alkylated benzene and other aromatic hydrocarbons, for example, alkyl benzene having fifteen to thirty carbon atoms in the alkyl group or groups. After contacting the oil and acid intimately, with cooling, the product is allowed to separate either by gravity or by centrifuging and two or three layers are obtained, depending on the reaction conditions. A small amount of water, e. g., 1 to 5%, can be added to aid separation of sludge and oil. Larger amounts of water tend to cause separation of a solid or semi-solid phase difficult to handle and impossible to pump through small diameter pipes. The upper oil layer is removed, leaving an acid sludge layer which may separate into a thin bottom layer, predominantly sulfuric acid, and a less fluid upper layer of acid and oil insoluble sulfonic acids, sometimes called green acids and/or brown acids. It is sometimes the practice to add to the sulfonation products a light solvent, such as petroleum naphtha or toluene or xylene to facilitate separation of sludge from oil. The solvent remains largely in the oil layer and is later recovered and used again. However, a small amount of solvent, about 1–2% in case of xylene, remains in the sludge and assists in keeping it fluid.

The concentration of sulfuric acid in the thin sludge ordinarily varies from about 70 to 90%. The dilution comprises water resulting from the sulfonation reaction and organic matter mainly sulfonated aromatic hydrocarbons, sulfated olefins, nitrogen bases, phenols, emulsified hydrocarbon oils, etc. Where a thick sludge or intermediate layer separates as herein above referred to, the acidity will usually correspond to about 35 to 50% $H_2SO_4$. Heretofore, the treatment and disposal of sulfuric acid sludges of this character has been a major problem in the petroleum oil, shale, and coal distillation industries. Recovery of the acid by reconcentration has involved serious problems with corrosion, atmospheric pollution, etc. Dumping in streams and in pits is generally prohibited by law because of pollution of water supplies. Where geographical location permits, the sludges are sometimes disposed of by dumping into the ocean at considerable handling cost and loss of potentially valuable acid. Burning is sometimes resorted to.

One object of this invention is to convert acid sludges to ammonium salts substantially without contamination by organic matter. Another object of the invention is to dispose of acid sludges without producing a nuisance from atmospheric pollution. Still another object of the invention is to produce from acid sludges a valuable carbon product useful for clarification and decolorizing purposes. Still another object of the invention is to provide an apparatus for disposing of acid sludges which will not be subjected to the corrosive action of dilute acid.

Referring to the drawing, a stream of sludge is charged by line 10 to heater 11, thence through screen 12 and into manifold 13, where it is conducted to a plurality of spray nozzles 14, directed into a coking drum 15. Simultaneously a stream of ammonia gas is introduced under pressure by line 16 through heater 17 and manifold 18 connected to the said nozzles 14. The nozzles 14 may be directed radially towards the center of drum 15 but it is preferred to direct them slightly tangentially to provide a swirling motion of the gases and vapors within drum 15. Nozzles 14 are of the concentric double orifice type in which the liquid sludge flows from the center orifice and the ammonia gas passes at high velocity through the annular space surrounding the sludge stream, thereby serving to atomize or disintegrate the sludge into fine particles which are instantly neutralized by the ammonia to form ammonium sulfate, ammonium sulfonates, and other products. These products, which are largely solid, settle to the bottom of the drum 15, while water vapor resulting from the neutralization reaction, oil vapors and other vapors, pass off at the top of the drum through line 19 leading to heat exchanger 20, cooler 21 and trap 22. A cylindrical or cone-shaped baffle 23 surrounding the top outlet from drum 15 serves to separate suspended salts from the vapors and prevent them plugging the transfer line 19, however salts which accumulate in line 19 can be periodically flushed therefrom by injecting a stream of water by line not shown. Extremely fine salt particles not separated by cyclone baffle 23 collect in trap 22 as a concentrated solution in part of the water which is condensed in exchanger 20 and cooler 21. This solution is conducted by line 24 through pump 25 and thence to spray nozzle 26, by which it is dispersed in the hot vapors and evaporated by the heat of the chemical reaction taking place in drum 15. Nozzles 14 are constructed to effect all the mixing of the ammonia and finely atomized sludge outside the body of the nozzle, thereby avoiding plugging of the nozzle and avoiding excessive heating during the neutralization reaction. If desired, drum 15 may be insulated as shown at 27 although this is not usually necessary where sludges of normally high concentration are employed. In fact it is generally desirable to apply cooling to the contents of drum 15 to prevent development of excessive temperatures. This is most conveniently done by injecting a water spray as indicated at 28. Thermocouples placed at convenient points in the wall of drum 15 indicate the temperature and can be connected to an automatic temperature controller for regulating the water supply at 28.

In starting up the process with a cold neutralizing drum, it is desirable to heat the drum initially, as by introducing a torch or hot gases. We have found it desirable to operate the drum 15 at a temperature upwards of 350° to 400° F., a suitable temperature range for most petroleum sludges being about 400 to 450° F. In order to more effectively utilize the by-product heat from the process, the temperature may be allowed to rise still higher, for example, from 500° to 600° F. At these operating temperatures the particles of neutralized sludge accumulating in the bottom of drum 15 undergo a secondary coking reaction which results in the substantially complete decomposition of the organic constituents thereof with the formation of dry, solid ammonium sulfate as the principal product. This coke forms a soft, gray mass in drum 15 which can be readily removed by mechanical means which will be hereinafter described.

The ratio of charging sludge and ammonia may be varied considerably, depending on the character of the ammonium sulfate desired, thus in the case of sludge titrating about 80 to 90% $H_2SO_4$ the use of about 30 lbs. of ammonia per 100 lbs. of sludge will produce a substantially neutral ammonium sulfate, whereas if the amount of ammonia is reduced to about 20 to 25 lbs. per 100 lbs. of sludge, the product will consist of a mixture of neutral and acid sulfate.

Where the ratio of ammonia is sufficiently low to produce acid sulfate, the steam and other vapors leaving the top of drum 15 may contain so little $NH_3$ they can be discarded at vent 29, or lead to a blow-down tank to avoid contaminating the atmosphere. Sulfur dioxide in the sludge charged passes off with the vent gases. Where the off gases contain ammonia it is desirable to recover the excess ammonia by conducting the vapors by line 30 to absorber 31 where the ammonia contained in them is absorbed in a stream of cool water introduced by line 32. The resulting ammonium hydroxide solution goes by line 33 and pump 34 to stripper 35, which is preferably operated under a moderate pressure somewhat higher than the pressure in drum 15. Vapors stripped in stripper 35 pass by line 36 back to drum 15 where their ammonia content is again neutralized by the acid injected by nozzles 14. Sulfur dioxide in the gases forms ammonium sulfite with excess $NH_3$ in absorber 31.

The water descending in stripper 35 is reboiled by heater 37, removing the ammonia therefrom and the water is then discarded by line 38. A portion of the water can be recycled by pump 39 through cooler 40 back to absorber 31. If desired, cold water for absorber 31 may be supplied from an outside source through valved line 41. Uncondensed gases from absorber 31 are discarded by line 42.

The pressure in absorber 31 is ordinarily slightly below the pressure in coking drum 15 and it is usually desirable to operate drum 15 at or near atmospheric pressure, for example, 1 to 5 p. s. i. g. However, by operating at higher pressures, the volume of vapors withdrawn by line 19 is correspondingly reduced in accordance with Boyle's law, thus reducing the gas velocities and carry-over of fine solids. Accordingly it may sometimes be desirable to operate drum 15 at higher pressures of the order of 15 to 50 or even 100 p. s. i. g.

Where the amount of ammonia carried over in the vapors from trap 22 is small we prefer to recover it by absorption in sulfuric acid. For this purpose we close valve 43 and open valve 44 leading to transfer line 45 and absorber 46. Sulfuric acid is introduced to the upper part of 46 by line 47 from circulating pump 48, passes over the baffles in 46 where it absorbs ammonia from the steam and hot gases flowing upward therethru and the recovered ammonia in acid solution then passes by pump 49 through line 50 to a suitable spray nozzle in the upper part of coking drum 15. If desired, however, the stream of acid and absorbed ammonia can be introduced along with the sludge feed in line 10 by a connection not shown. Dilute sulfuric acid, e. g. 10–25%, is satisfactory for introduction to absorber 46, and we prefer to use for this purpose, diluted sludge acid, preferably after boiling to eliminate colloidally suspended organic matter.

Absorber 46 will usually operate at atmospheric pressure and unabsorbed steam and vapors are conducted by vent line 51 preferably leading to a suitable blowdown drum wherein the steam is condensed and other condensates disposed of.

Volatile hydrocarbons contained in the sludge, for example, aromatic solvents, benzene, toluene, xylene, naphtha, etc., will be found in the condensed vapor from line 51. When operating with absorber 31, such hydrocarbon oils form an upper layer in the base of absorber 31 and are withdrawn periodically by valved line 52.

When sufficient $SO_2$ is present to combine with all $NH_3$ in the gases, we can omit the acid in absorber 46, introducing a stream of water by line 47 instead, sufficient to absorb the ammonium sulfite from the gases. The resulting solution of ammonium sulfite is collected and recycled by line 50 to drum 15. Excess $SO_2$ can be recovered from line 51. Where two or more sludges are available, they can be mixed before charging to line 10 but it is usually preferable to charge them through separate neutralizing spray nozzles 14 through a separate manifold not shown. Thus a thick sludge of 30 to 40% acid concentration and 25 to 50% organic matter may be charged simultaneously through separate nozzles with a thin sludge of 80 to 90% acid concentration, $H_2SO_4$ basis. Operating in this way, better control of the neutralization is obtainable inasmuch as such sludges commonly tend to separate on standing in lines, tanks, screens, etc. Water may also be added to the sludge to provide additional cooling in drum 15 when it is so desired, although usually economy dictates the introduction of both the ammonia and sludge streams at an elevated temperature 125 to 250° F. to increase the heat available for operating the process, thereby raising the temperature of heat exchanger 20.

After drum 15 has become filled to a point below nozzles 14 with the reaction product in the form of a soft, gray coke, the operation is discontinued and the coke is removed. However, in order to maintain continuous operation of the ammonia recovery part of the system, it is usually desirable to operate coking drum 50 in duplicate, alternating the charge from one drum to the other and maintaining continuous operation of the "overhead system." For this purpose, lines 19, 24, 36 and 50 are manifolded between the two drums.

Various means may be employed to remove coke from drum 15 and the drawing shows a hydraulic drill for this purpose. To operate the drill, the bottom head or plate 53 is unbolted and swung to one side and rotating hydraulic nozzle 54 carried on shaft 55 is forced upward into the drum through the opening. Nozzle 54 is supplied by a liquid under high pressure from pump 56 to which it is connected by flexible lines 57. For this purpose, a solution of ammonium sulfate may be employed. The coke, comprised of carbon and ammonium sulfate, drops into pan 58 and flows by line 59 to filter 60 which may be of the simple de-watering type where the carbon is filtered from the solution and washed with water on a revolving drum. Carbon passes from the filter by line 61 while the filtered solution flows through line 62 to product solution storage 63. The solution, which is substantially a solution of ammonium sulfate is withdrawn by line 64 to a suitable evaporator where crystalline ammonium sulfate and/or ammonium acid sulfate are produced. The pressure in line 57 required for operating the hydraulic head 54 can be on the order of 500 to 1500 p. s. i.

After the drum 15 has been cleaned free of ammonium sulfate, the head is replaced and the drum is ready for further operation. Inasmuch as the coke formed in drum 15 is soft and friable, various mechanical means may be provided for removing it from the drum, either continuously or intermittently during operation. Thus we may use a beater type drill by which a central shaft is passed upwardly into the drum and is rotated with chains or flails attached to the head to pulverize the coke in the drum and drop it to the bottom where it can be removed by a conventional rotary type conveyor. The solid ammonium sulfate and carbon can then be processed as shown in our Serial No. 356,398.

The carbon produced at 61 is a fine, porous material, which may amount to about 10 to 20% of the weight of the coke produced. After thoroughly washing with hot water, and heat treating, it is satisfactory for use as a decolorizing carbon.

As an example of our process, a stream of sludge containing about 85% $H_2SO_4$ obtained from the treatment of lubricating oil with fuming sulfuric acid, was heated to about 150° F. and charged to an atomizing nozzle in the upper part of the coking drum, simultaneously with a stream of ammonia gas heated to about the same temperature. The $NH_3$ and sludge were intimately mixed at the tip of the nozzle as previously described, the $NH_3$ pressure being about 175 p. s. i. g. The temperature of the drum rapidly rose to 350° F. in 40 minutes, starting at atmospheric temperature, and to 390° F. in 65 minutes. It was held at this temperature for the duration of the run and after shut-down and cooling there was taken from the body of the drum, 145 lbs. of a gray, soft coke which was dissolved in hot water and filtered free of carbon. The yield of carbon was 13.6%. The solution of ammonium sulfate was evaporated to dryness, yielding 85.5% of white crystalline ammonium sulfate substantially entirely free of organic matter. A small amount of a light oil was collected from the condensate dripping from the vapor line leaving the top of the neutralizing drum.

The carbon obtained from the coke was washed with water to remove all soluble matter and heated away from air to a temperature of 1200° F. for a period of 20 minutes. After cooling it was used to decolorize a brownish, yellow solution of impure sugar. Most of the color was removed from the sugar solution in one treatment, indicating its absorptive character. The carbon obtained in our process is extremely porous and granular. Accordingly it is also adapted for other applications to which porous carbon is commonly applied, for example, as an ingredient in compounding rubber, paints, plastics, etc.

Although we have described our invention with respect to certain applications thereof, we do not intend that it be restricted thereby, and numerour modifications in apparatus and method can be made without departing from the invention. Thus, other means for cooling reactor 15 can be employed, such as injection of liquid ammonia, and water spray 28 can be introduced at a point below nozzles 14 to effect more rapid cooling. Aqueous ammonia can also be used in some or all the nozzle 14 to effect cooling by evaporation of water.

This patent application is a continuation in part of our application, Serial No. 356,398, filed May 21, 1953, for which U. S. Patent No. 2,754,192 was issued on July 10, 1956.

Having thus described our invention, what we claim is:

1. The process of making ammonium salts from sulfuric acid sludges containing organic derivatives of sulfuric acid which comprises simultaneously dispersing and mixing a stream of said sludge with a stream of ammonia in a reaction zone, maintaining the resulting reaction product at a temperature above about 350° F. and retaining the reaction product at said temperature for sufficient time to effect substantially complete decomposition of said organic derivatives of sulfuric acid therein, forming a mass of carbon and ammonium salts of sulfuric acid.

2. The process of claim 1 wherein the ratio of ammonia to sludge is controlled to produce acid ammonium sulfate and substantially no excess ammonia vapor.

3. The process of claim 1 wherein steam and excess ammonia vapor are withdrawn from the reaction zone and the ammonia is recovered by scrubbing with sulfuric acid substantially without condensation of said steam.

4. The process of claim 3 wherein recovered ammonia and sulfuric acid are recycled to the zone of reaction.

5. The process of making ammonium sulfate from petroleum acid sludge containing sulfuric and sulfonic acids which comprises atomizing said sludge within a reaction zone with a high velocity stream of ammonia thereby effecting neutralization of said acids, maintaining a temperature in said reaction zone above about 350° F. thereby effecting decomposition of ammonium sulfonates with the production of carbon and ammonium sulfate and recovering ammonium sulfate from the said carbon product.

6. The process of claim 5 wherein excess ammonia is recovered from the steam produced in said reaction zone and said ammonia is returned to said reaction zone for neutralization of sludge therein.

7. The process of claim 5 wherein sulfur dioxide evolved from said reaction zone is recovered in combination with excess ammonia as ammonium sulfite.

8. The process of claim 5 wherein steam from said reaction zone is partially condensed and the resulting condensate containing ammonium salts carried from said reaction zone as a dust is recycled to said reaction zone.

9. The process of claim 5 wherein excess ammonia vapor and steam from said reaction zone are scrubbed with hot, dilute sulfuric acid to recover ammonia therefrom and the resulting solution is recycled to the reaction zone while uncondensed steam and other gases are discarded.

References Cited in the file of this patent

UNITED STATES PATENTS

| | | |
|---|---|---|
| 324,005 | Burrell | Aug. 11, 1885 |
| 501,164 | Roberts | July 11, 1893 |
| 1,962,185 | Fauser | June 12, 1934 |
| 2,025,401 | Rutherford | Dec. 24, 1935 |
| 2,074,061 | Mullen | Mar. 16, 1937 |
| 2,217,919 | Rostler | Oct. 15, 1940 |
| 2,324,222 | Maleson | July 13, 1943 |
| 2,524,341 | Chapman | Oct. 3, 1950 |
| 2,586,729 | Schmidl | Feb. 19, 1952 |
| 2,648,594 | Olsen | Aug. 30, 1953 |
| 2,659,659 | Schmidl | Nov. 17, 1953 |

FOREIGN PATENTS

| | | |
|---|---|---|
| 413,967 | Great Britain | July 26, 1934 |

OTHER REFERENCES

Perry: "Chemical Engineers Handbook," McGraw Hill Book Co., New York, 1941, page 398.